United States Patent
Boullery et al.

(10) Patent No.: US 9,355,402 B2
(45) Date of Patent: May 31, 2016

(54) SYSTEM, METHOD AND COMPUTER PROGRAM PRODUCT FOR IMPROVING MESSAGES CONTENT USING USER'S TAGGING FEEDBACK

(75) Inventors: Didier Boullery, Sartrouville (FR); Hisham E. El-Shishiny, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 13/395,453

(22) PCT Filed: Jun. 1, 2010

(86) PCT No.: PCT/EP2010/057587
§ 371 (c)(1),
(2), (4) Date: Mar. 12, 2012

(87) PCT Pub. No.: WO2011/032737
PCT Pub. Date: Mar. 24, 2011

(65) Prior Publication Data
US 2012/0173550 A1      Jul. 5, 2012

(30) Foreign Application Priority Data
Sep. 15, 2009   (EP) .................................. 09305844

(51) Int. Cl.
*G06F 17/30* (2006.01)
*G06Q 30/02* (2012.01)

(52) U.S. Cl.
CPC .......... *G06Q 30/02* (2013.01); *G06F 17/30038* (2013.01)

(58) Field of Classification Search
CPC ................................................. G06F 17/30038
USPC .................................................. 707/732, 706
See application file for complete search history.

(56) References Cited

U.S. PATENT DOCUMENTS

| | | | |
|---|---|---|---|
| 8,108,389 B2 * | 1/2012 | Bobick et al. ................. | 707/736 |
| 2003/0041072 A1 * | 2/2003 | Segal et al. ................ | 707/104.1 |
| 2005/0278241 A1 * | 12/2005 | Reader ............................ | 705/37 |
| 2008/0133488 A1 | 6/2008 | Bandaru et al. | |
| 2008/0147487 A1 * | 6/2008 | Hirshberg ...................... | 705/10 |
| 2008/0154698 A1 | 6/2008 | Flake et al. | |

OTHER PUBLICATIONS

Ganesan et al., Mining Tag Clouds and Emoticons behind Community Feedback, Apr. 21-25, 2008, Beijing, China, pp. 1181-1182.
Stylianos Vasilakis, PCT Notification of Transmittal of the International Search Report and the Written Opinion of the International Searching Authority, or the Declaration, Mar. 16, 2011, 7 pages.

* cited by examiner

*Primary Examiner* — Miranda Huang
(74) *Attorney, Agent, or Firm* — Dan Simek; Hoffman Warnick LLC (57) ABSTRACT

The present invention is a system and method to improve the impact of marketing messages broadcasted to various web communities. Marketing communication keywords that are predefined are matched against tags set by private and public user's tagging communities. Semantic analysis is applied on the keywords and the tags and resulting associations allow determining relevance of marketing keywords. Matches indicate where marketing people have met their goals while matching gaps indicate marketing messages have not been perceived by the companies or the market. Valuable feedback is thus obtained to help re-enforce the initial messages that were not received or to replace the message wording by the one perceived from the identified market tags.

13 Claims, 7 Drawing Sheets

SYSTEM, METHOD AND COMPUTER PROGRAM PRODUCT FOR IMPROVING MESSAGES CONTENT USING USER'S TAGGING FEEDBACK

TECHNICAL FIELD

The present invention relates generally to the field of computer systems and software, and more specifically to a method, system and computer program product for improving message content by interpreting user's tagging.

BACKGROUND OF THE INVENTION

In today information technology environment, marketing organizations use various different media to communicate their messages to promote products and or services. They usually conduct surveys on a regular basis to get feedback on a campaign to get an appreciation of the impact of the marketing message associated with the campaign. Those surveys are generally expensive, and do not necessarily have a near-real-time unbiased feedback from the global community of users who had paid attention to their marketing communication. Consequently the feedback is not fully optimal and the marketing organizations are missing a lot of free and valuable market community feedback.

It has become more and more frequent to offer to consumers and more generally to computer users the possibility to contribute by setting up tags related to a field of interest on a receiving message. Tagging is a function that associates an identifier or a keyword—a tag—to a specific piece of information which can be as varied as a computer file, an internet page, a digital image or any web-based object.

Media tagging is becoming more and more a wide spread web pattern used either through the internet or through intranet by individuals and company employees and currently there exists social web sites of collective published tags or bookmarks for storing, sharing, discovering tags and bookmarks of user's communities tags.

For marketing organizations, tagging has become a metric to get feedback and find out how a particular communication, whatever the media (text, audio or video), is perceived by a user's community tagging the communication.

The following patents and articles disclose several solutions and approaches to analysing tagging:

In 'Mining Tag Clouds and Emoticons behind Community Feedback' (www2008.org/papers/pdf/p1181-ganesan.pdf), Kavita A. Ganesan et al describe a system that mines tags from short texts, which is user feedback. It mines and identifies tags that are more representative of a user among users in a community. However, this feedback is not matched against the messages of an original communication.

In U.S. Patent Application 20080133488, titled 'Method and System for analyzing user-generated content', the inventors address the problem of how to easily analyze all user-generated content, in various forms, relevant to a particular topic, or related to a group of topics. The proposed system provides the ability to search within a defined group presenting to a searcher the most relevant information. However, this solution does not compare between initial communications keywords and tags created either in the Intranet or the Internet.

In U.S. Patent Application 20080154698, titled 'Dynamic Product Classification for Opinion Aggregation', Flake et al. discloses an architecture that can utilize features of a product to facilitate organization and/or classification of products or product features as well as opinions relating to those products or product features into market identifiers. However, this method does not attempt to relate specific communication keywords to tags.

Thus, there is a need for a system and method for measuring the effectiveness of a communication broadcasted on a plurality of user's communities, and for providing valuable feedback to enhance the content of initial messages.

Moreover, there is also the need to measure how user's feedback evolves over time.

The present invention offers a solution to these needs.

SUMMARY OF THE INVENTION

Accordingly, a first object of the invention is to provide a system and a method that relies on user's tagging in order to improve communications contents.

The present invention links the marketing organizations with the user's tagging either from private and public, in order to assess if a marketing message has been properly perceived by an audience.

Another object of the present invention is to allow marketing to be closer to the market needs by having key messages that meet the market expectations.

According to the invention, here is provided a system and method as further described in the appended independent claims.

Further embodiments are described in the appended dependent claims.

Further aspects of the invention will now be described, by way of preferred implementation and examples, with reference to the accompanying figures.

BRIEF DESCRIPTION OF THE DRAWINGS

The above and other items, features and advantages of the invention will be better understood by reading the following more particular description of the invention in conjunction with the accompanying drawings wherein.

DETAILED DESCRIPTION OF THE INVENTION

Embodiments of the invention are described herein after by way of examples with reference to the accompanying figures and drawings.

Figure 1:
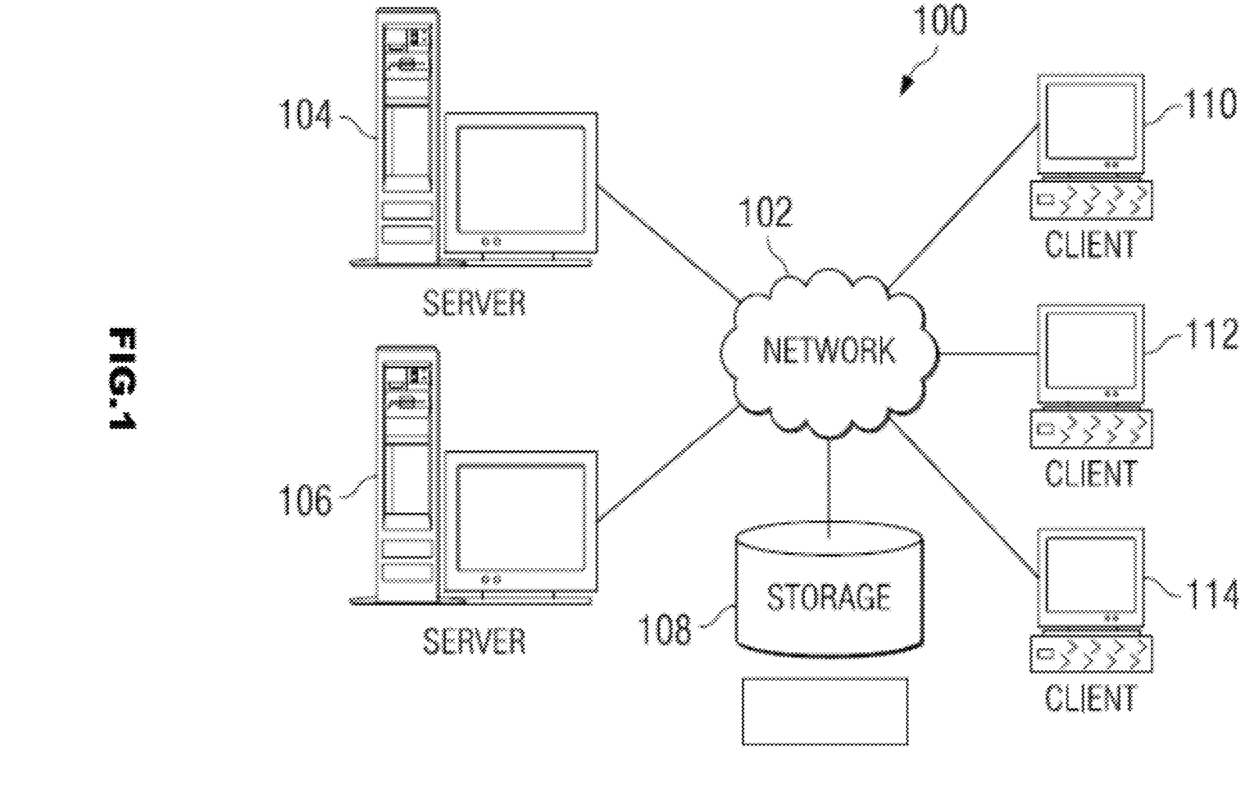
FIG. 1 depicts a pictorial representation of a network of data processing systems in which aspects of the present invention may be implemented.

FIG. 1 is provided as an exemplary diagram of a network data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114, as well as any communication messages that may be received by any or all of clients 110, 112, and 114. Clients 110, 112, and 114 are clients to server 104 in this example, but may also be client to server 106 to receive collective or individual communication. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

The present invention provides a computer implemented method, system and computer program product for enhancing message content in a distributed messaging system. A data processing device of the distributed messaging system may be implemented as a stand-alone computing device, or as a distributed data processing system in which multiple computing devices are utilized to perform various aspects of the present invention. In accordance with an exemplary embodiment of the present invention, a network data processing system, such as network data processing system 100 illustrated in FIG. 1, provides a distributed messaging system having a plurality of clients, for example, all or a subset of clients 110, 112 and 114 in FIG. 1, for receiving the messages generated by one or more servers, such as one or more of servers 104 and 106 in FIG. 1. It is intended in the present description that a message or a communication may be any of an advertising, documenting, demonstration, communicating, community-sharing . . . .

Figure 2:
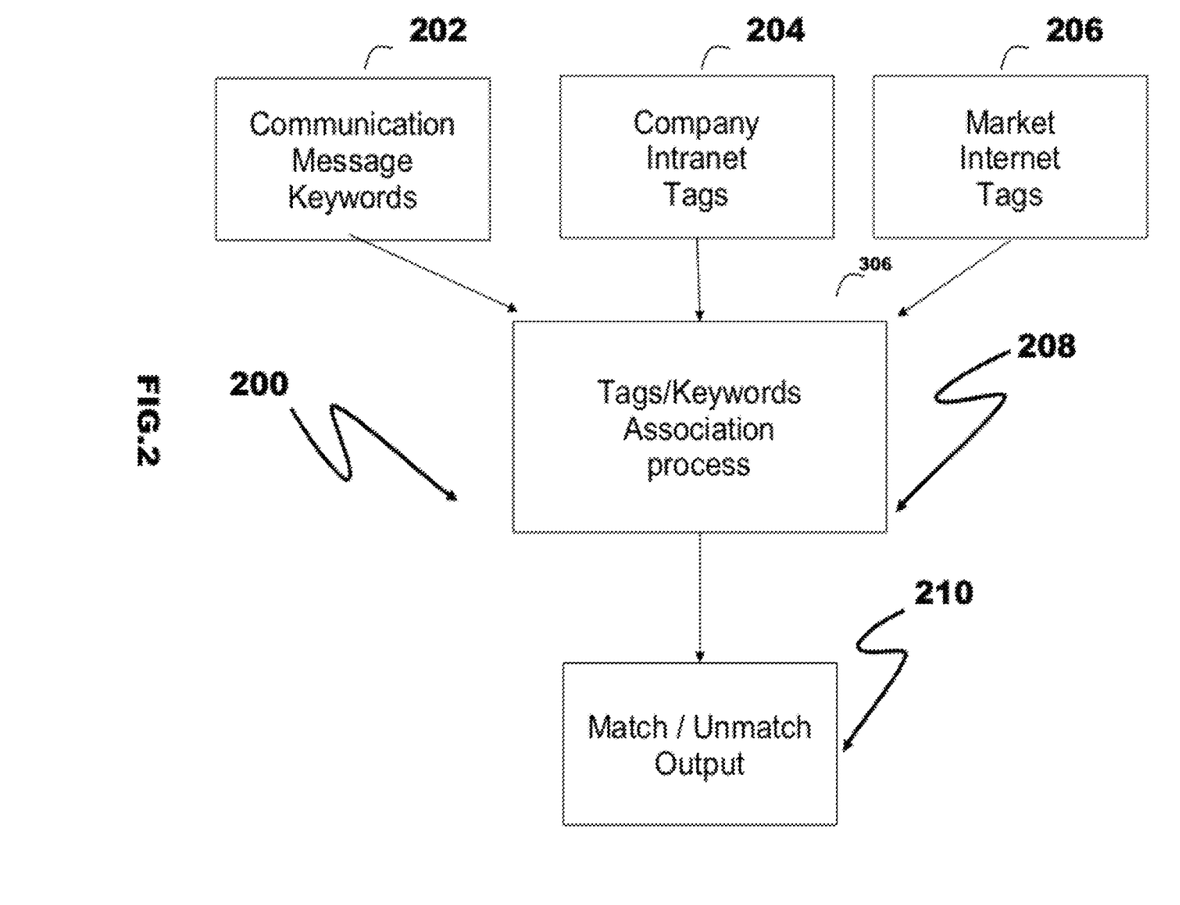
FIG. 2 depicts a block diagram of the main components used in a preferred embodiment of the present invention.

FIG. 2 depicts a block diagram of the main components used in a preferred embodiment of the present invention. FIG. 2 is described conjunctly with the examples provided in FIGS. 3 to 6.

The reverse market system 200 of the present invention is first composed of a keywords message component 202 which is able to store keywords that are defined for a message to be communicated to users. It is to be appreciated that the term 'message' used herein relates to any form of topic, indifferently related to a product or a service. Moreover, it is also to be understood that a message may be either a full complete communication send or made available to users as such or any sub-part of a more general communication, as illustrated on FIG. 3.

Figure 3:
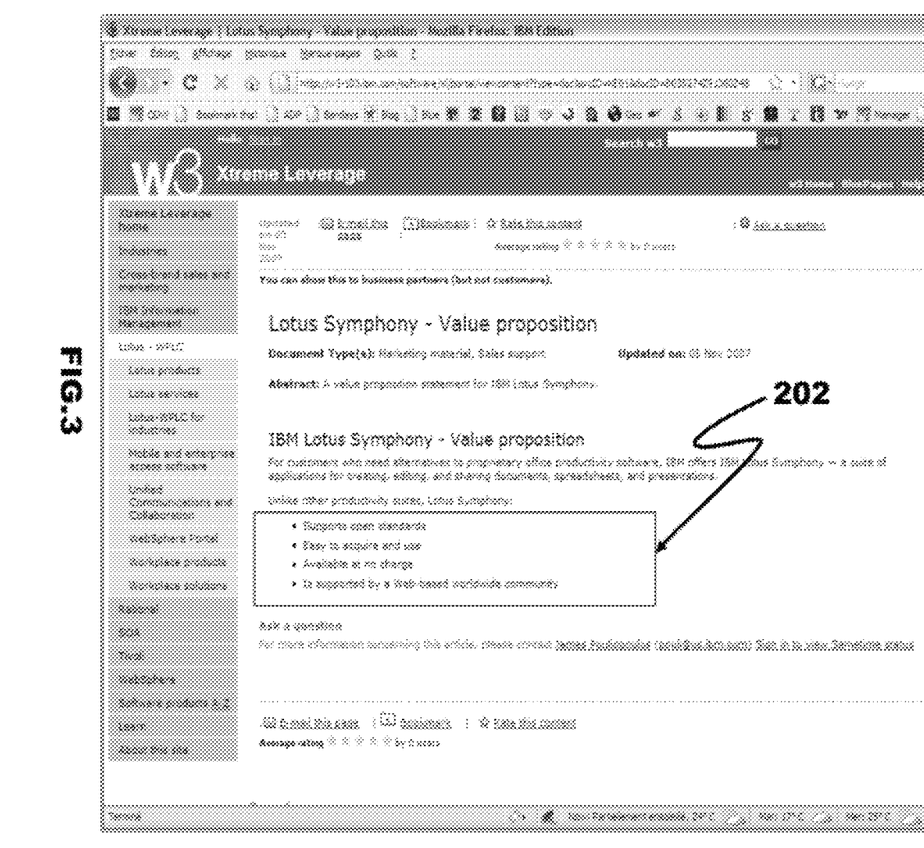
FIGS. 3 to 6 exemplify the components of FIG. 2.

As shown on FIG. 3, a web page includes among a plurality of various information, a message that an owning organization intends to be broadcasted through a computer network to users. The core of the message from the owner side which is to be acknowledged by the user's community is shown as reference numeral 202 as having four key points. In the present example, the message is part of an intranet web page but it is not to be interpreted as a limitation as a message in the sense of the present invention may be broadcasted to or posted on any public web site. The four key points may be stored in their entirety as four keywords, relevant for the message, or only some sub parts (one or several words for example) of each key point may be stored.

The message in the present example recites:
  supports open standard
  easy to acquire and use
  available at no charge
  is supported by a web-based worldwide community
wherein the following list of expressions and/or words shows the keywords the originator of the message wants to be acknowledged by the receivers:
  open standard
  easy
  acquire
  use
  available
  no charge
  web-based worldwide community.

The reverse market system 200 also comprises tags repositories 204 and 206 which are able to store respectively tags defined by users either from a company receiving the message on an intranet (designed herein as company tags or intranet tags) and from the market from users receiving the message on the internet (designed herein as market tags or internet tags).

Figure 4:
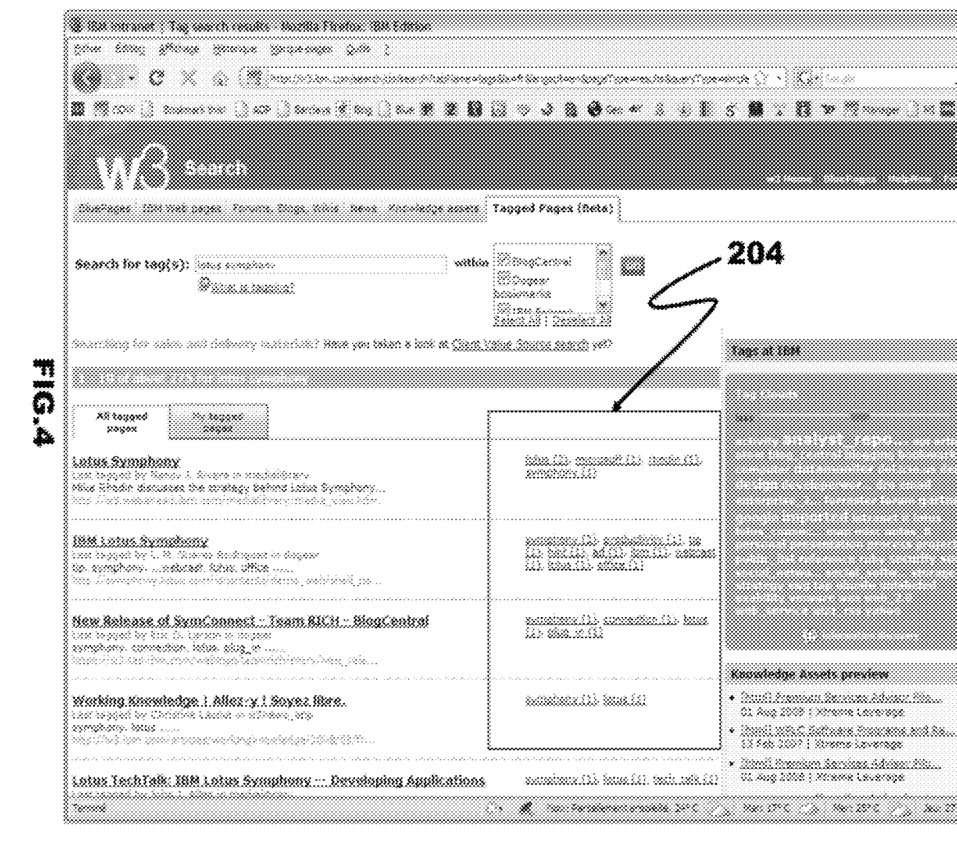

The reference numeral 204 illustrates on FIG. 4 the tags that have been defined by an intranet user's community from the original message of FIG. 3. In this example, the word "Lotus" has been tagged 6 times, the word "Symphony" 5 times, the word "IBM" has been tagged one time.

Figure 5:
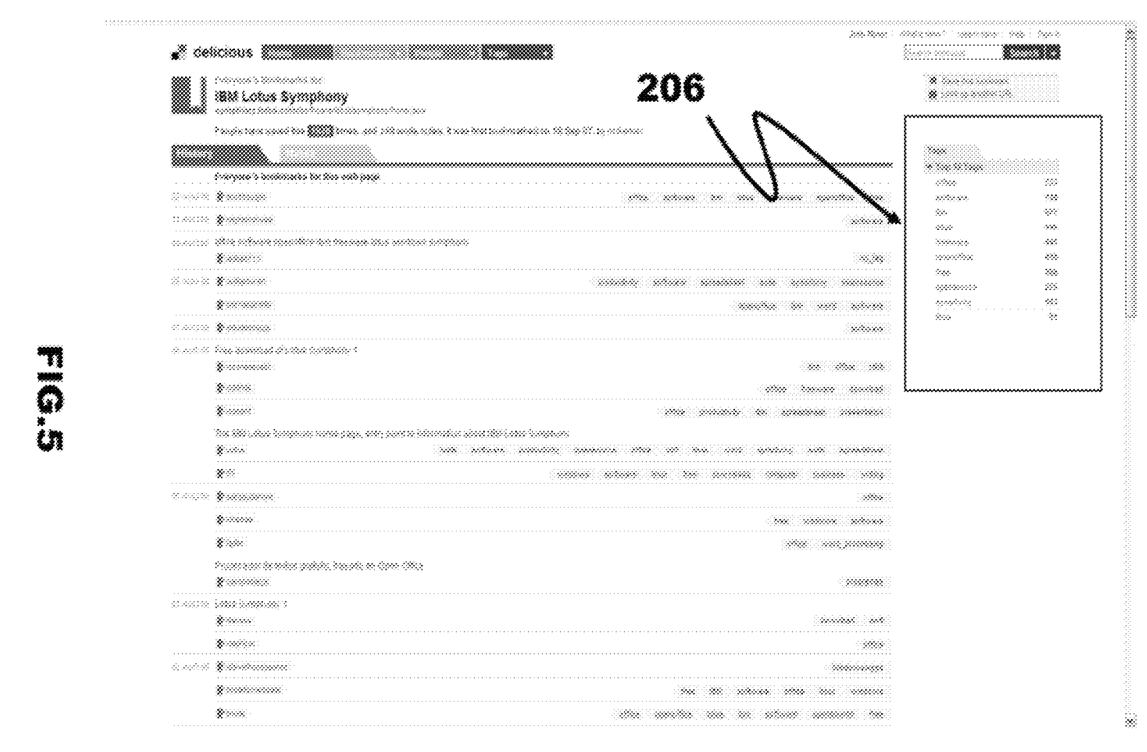

On next FIG. 5, reference numeral 206 illustrates the tags defined by an internet user's community. In this example, the word "Office" has been tagged 733 times, the word "Software" 728 times, the word "IBM" has been tagged 577 times.

The internet user's tags may be searched on any public bookmarking web site, such as the well-known "del.icio.us" web site.

There are several ways to search on these web sites. A first one is to base the search on the title the originator gave to his message (i.e. "IBM Lotus Symphony" in the previous example) and to grab all tags that a web site returns. A second approach is to base the search on the url of the message to get the tags strictly associated to the message. Both search methods can be used separately or conjunctly to produce different results, depending on the owner's intention. FIG. 5 illustrates results obtained using the first approach.

Figure 6:
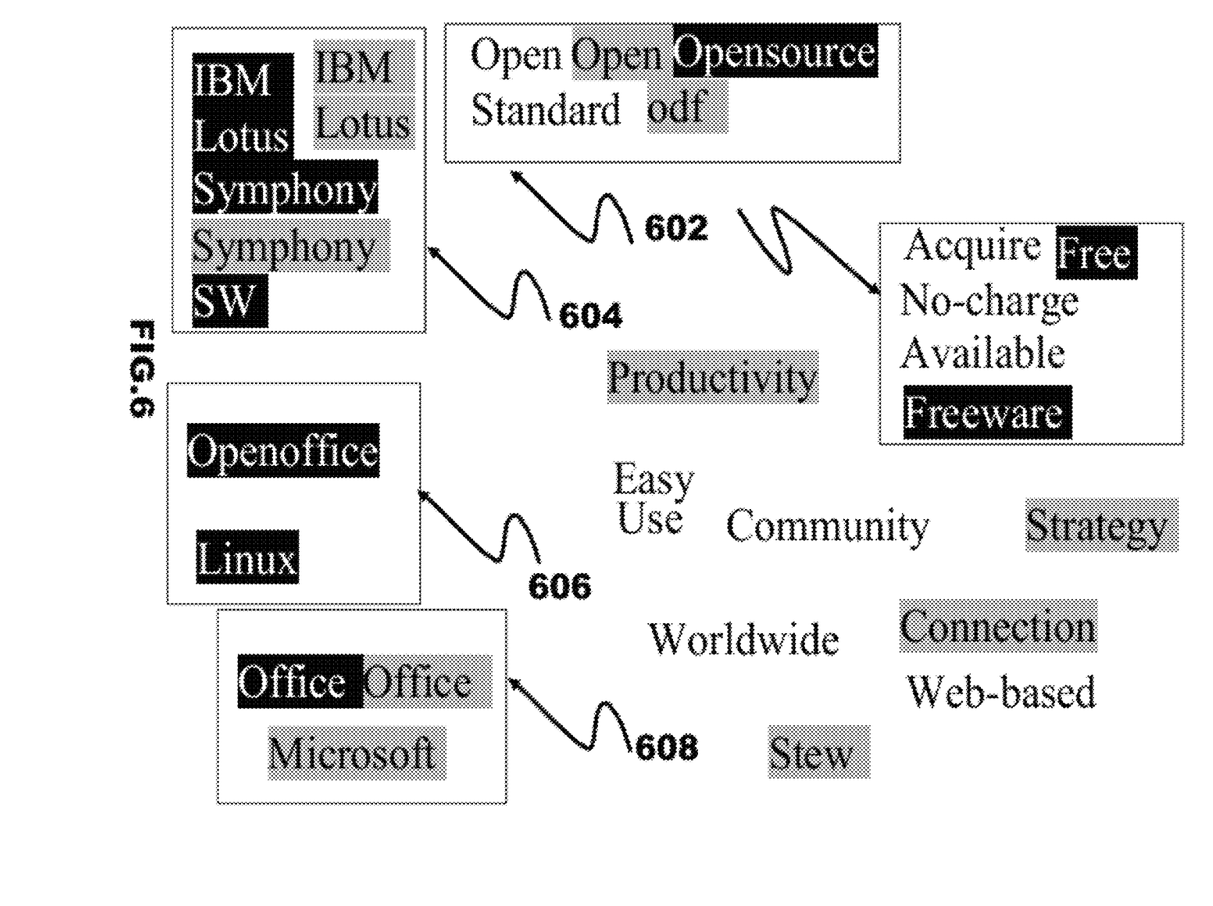

Components 202, 204 and 206 are coupled to a tag/keyword association component 208 which performs a process as will be further described with reference to FIG. 7. The tag/keyword association bloc 208 may be also coupled to an output bloc 210 which allows to provide the matching and non-matching between the keywords of the original message and the various tags analyzed. FIG. 6 shows a mapping representation of the result of the association process run on the example of FIGS. 4 to 6. It is to be understood that a mapping representation is one of the possible forms of the output of bloc 208 which may be any visual or other representation provided as useful feedback information to the owner of the message.

Not shown on FIG. 2 are one or more communication connections between the association bloc 208 and computer systems of any interested end user that would have interest in getting such result.

On the example of FIG. 6, it is shown that boxes 602 perfectly match between all communities, intranet and internet. This provides the feedback that those keywords have meet the target.

The box 604 indicates that the Company (here the Applicant IBM) does not need to refer to her Brand name IBM with the trademarks Lotus and Symphony to be clearly identified. This provides the feedback that the previous brand marketing was successfully done.

The box 606 illustrates group of words or expressions that the end-users tag in association to a keyword. The example of box 606 shows that among the tags that end-users from the market often tagged "Symphony" with, were "OpenOffice" and "Linux" together. This means that end-users from the market identified the association between the two, which shows that end-users understand that "OpenOffice" runs on "Linux".

The box 608 illustrates that the listed competitive products are clearly identified by the market.

The marketing expression such as <<easy to use>> and <<Web-based Worldwide community>> appears to be ignored by both intranet and internet user's community. This provides the feedback to either improve the original message with alternative expressions or to replace some orphan tags such as for example the words <<productivity>>, <<connection>> and <<strategy>> that have been identified by the users.

The analysis provided by the process of the present invention also allows pointing to unexpected tags such as the word <<stew>> and thus may help improve the general knowledge of the users tagging decision process.

Some further considerations may be derived from the analysis such as providing indication that some words should be combined or associated with others.

The results may be saved, stored, exported and reused for trend analysis or comparison with other analyses. The total number of tags for example is information that can indicate the overall interest for the message.

These feedbacks also evolve over the time and can show trends that marketing organization may decide to follow or drive or influence.

Figure 7:
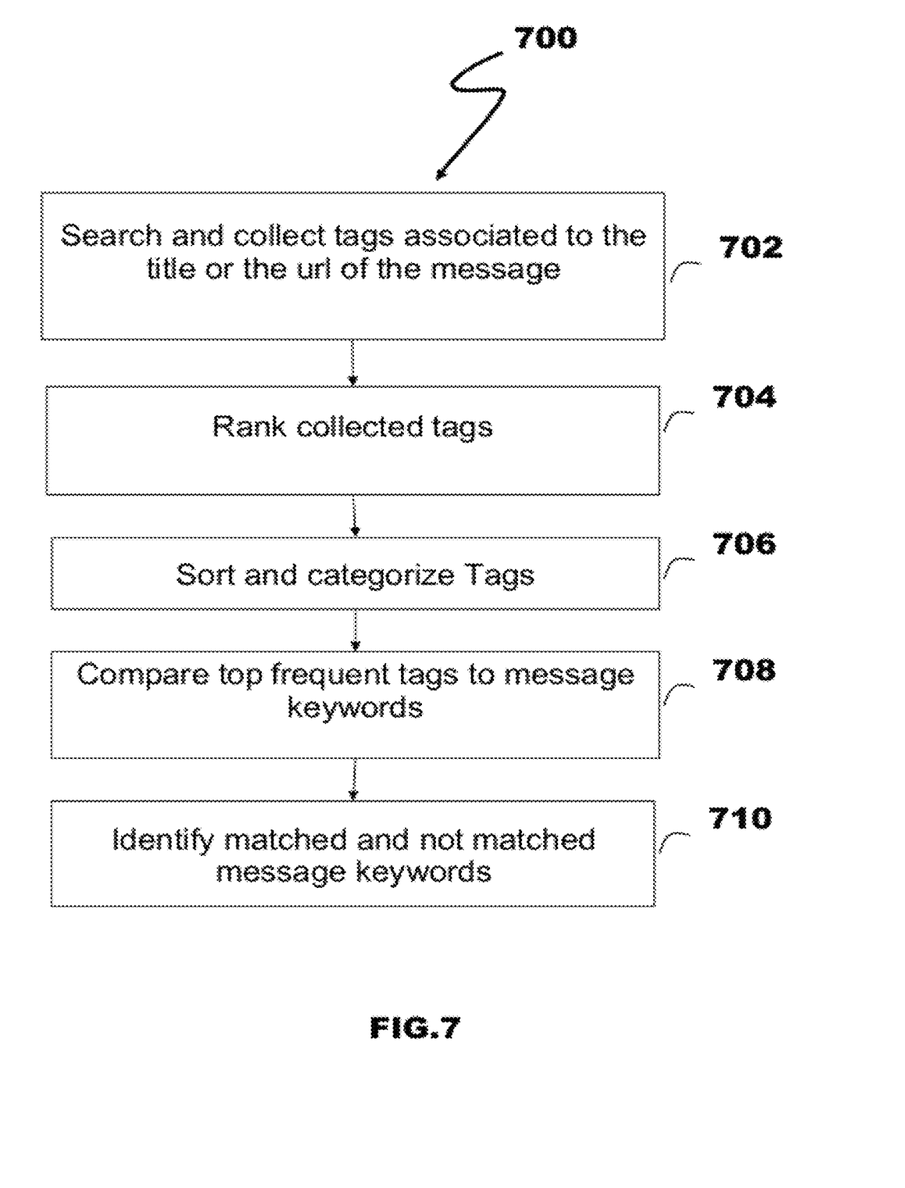
FIG. 7 shows a flow chart of the steps to run the reverse market process in a preferred embodiment of the present invention.

With reference to FIG. 7, a flow chart showing the steps to operate the reverse market process in a preferred embodiment of the present invention is now described.

The process starts after a message on which a feedback analysis is required has been broadcasted to users. In an initial phase not shown on the flow chart, one or more keywords have been identified in the message and stored in the Keyword message repository (202). As already explained, the keyword(s) may be single word(s) or expression(s) qualifying the content of the message for which the owner wants to discover how it is perceived by the tagging communities.

On a first step 702, a query is generated to search and collect a plurality of tags from communities of users either or both from intranet or internet networks.

It is to be appreciated that the query may also specify the internet web sites to be searched, such as the "del.icio.us" one or the "Google Bookmarks" ones to name a few. As already mentioned, the search may be done on a query specifying keywords from the message title or specifying the message url address, or both.

Once collected and stored in the tags repositories (204, 206), the process follows with step 704.

On step 704, a ranking operation is performed on the occurrence frequency of the tags. The lower frequent tags may be ignored and rejected at that step and only the top frequent tags remain for the next step. It is to be appreciated that a threshold on the frequency may be defined by the user and adapted according to any previous feedback on similar analysis.

On next step 706, tags are sorted and categorized using a semantic analysis. The person skilled in the art would choose any known semantic analysis method at this step to sort the tags, create groups and allocate the tags within each group.

Then, on next step 708, the tags are compared to the keywords previously defined. The skilled man will appreciate that the comparison may be extended to synonyms and related words of the original keywords as contained in the message, and as such the repository may include a thesaurus associated to the keywords that may also be enriched by the feedback analysis. Moreover, a stem extractor may be used in order to take care of the different forms of a word (such as singular and plural forms of word).

On next step 710, a full description of the keywords and tags that match and not match is generated. The result provides with a list or view of:

- the keywords along with their categories that were not matched by the intranet users and/or the internet users;
- the keywords that were matched by the intranet users and/or the internet users;
- the specific categories (if any) to which the matching intranet tags and internet tags belong to allow updating any word association.
- the tags that occur frequently in combination (either from intranet or internet tags) to allow updating novel association of words.

The present invention affords several improvements and novel functionality to previous art. In particular, an owner of a document would be able to select the tagging communities where he/she wants the tags to be extracted from, to become more specific or to compare the various tagging communities. The present invention enables to get in an easy way a market feedback analysis, as the owner of the message can monitor tagging variations with time and observe how the matching between the marketing message and tags is evolving with time. Consequently, he/she can improve the content of future marketing communication as a result of the efforts to close the gap identified previously, thereby assessing the impact of the effort. By replacing the first keywords with the most frequent tags users are applying to his document title or url, the message originator will generate more hits on his document when users are searching on the internet, offering then a better visibility to his message.

The present invention thus provides a computer implemented method, system and can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer implemented method for improving message content broadcasted through a computer network, the method comprising:
   defining a plurality of message keywords in a message content of a broadcasted message and storing each defined message keyword in a keyword message repository;
   generating a query for a plurality of tags associated with the message content of the broadcasted message;
   searching and collecting through the computer network, using the generated query, tags associated with the message content of the broadcasted message from a plurality of tag repositories, wherein at least one tag repository of the plurality of tag repositories is an intranet tag repository and at least one tag repository of the plurality of tag repositories is an internet tag repository;
   comparing the collected tags from each of the plurality of tag repositories to each defined message keyword stored in the keyword message repository and to synonyms and different forms of each defined message keyword stored in the keyword message repository, wherein the keyword message repository includes a thesaurus for determining the synonyms of each defined message keyword and a stem extractor for determining the different forms of each defined message keyword, the different forms of each defined message keyword comprising singular and plural forms of each defined message keyword; and
   identifying the collected tags that match one or more of the defined message keywords stored in the keyword message repository and that match across the plurality of tag repositories.

2. The method of claim 1, further comprising, before the comparing, ranking the tags.

3. The method of claim 2, wherein the tags are ranked by their occurrence frequency.

4. The method of claim 2, further comprising, after the ranking step, sorting and categorizing the ranked tags using a semantic analysis process.

5. The method of claim 4, wherein the sorting further comprises rejecting tags ranked below a predefined threshold.

6. The method of claim 1, the computer network is the Internet network and/or an intranet network.

7. The method of claim 1, wherein the searching further comprises searching bookmarking web sites available through the computer network.

8. The method of claim 1, wherein the at least one message keyword is a word included in a title of the message.

9. The method of claim 1, wherein the at least one message keyword is a URL address of the message.

10. The method of claim 1, further comprising, after the collecting, storing the collected tags in a tag repository.

11. The method claim 1, further comprising modifying the message content according to a result of the matching.

12. A system for improving message content broadcasted through a computer network, the system implementing the method of claim 1.

13. A non-transitory computer readable medium having a computer program product stored thereon, which when executed by a computing device, implements the method of claim 1.

* * * * *